(12) United States Patent
Jagadeesan

(10) Patent No.: US 6,930,982 B2
(45) Date of Patent: Aug. 16, 2005

(54) DEVICES, SOFTWARE AND METHODS FOR MEASURING PACKET LOSS BURSTINESS TO DETERMINE QUALITY OF VOICE DATA TRANSMISSION THROUGH A NETWORK

(75) Inventor: Ramanathan T. Jagadeesan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 761 days.

(21) Appl. No.: 09/735,429

(22) Filed: Dec. 12, 2000

(65) Prior Publication Data

US 2002/0101886 A1 Aug. 1, 2002

(51) Int. Cl.[7] .......................... H04L 12/26; H04L 12/56
(52) U.S. Cl. ...................... 370/252; 370/394; 370/474; 370/476; 714/761; 714/762; 714/776
(58) Field of Search ................................. 370/235, 242, 370/244, 252–253, 352, 356, 394, 345.62, 474, 476, 503, 508, 509, 516, 517; 714/761–762, 776; 375/354, 356, 359

(56) References Cited

U.S. PATENT DOCUMENTS

| | | | | |
|---|---|---|---|---|
| 5,956,729 A | * | 9/1999 | Goetz et al. ............. | 707/104.1 |
| 6,370,120 B1 | * | 4/2002 | Hardy ......................... | 370/252 |
| 6,405,257 B1 | * | 6/2002 | Gersht et al. ............... | 709/235 |
| 6,434,606 B1 | * | 8/2002 | Borella et al. .............. | 709/214 |
| 6,487,603 B1 | * | 11/2002 | Schuster et al. ............ | 709/231 |
| 6,597,660 B1 | * | 7/2003 | Rueda et al. ............. | 370/230.1 |
| 6,693,921 B1 | * | 2/2004 | Whitfield .................... | 370/516 |
| 6,694,478 B1 | * | 2/2004 | Martinian et al. .......... | 714/788 |
| 6,741,569 B1 | * | 5/2004 | Clark .......................... | 370/252 |
| 2002/0031126 A1 | * | 3/2002 | Crichton et al. ............ | 370/394 |
| 2002/0145982 A1 | * | 10/2002 | Talpade et al. ............. | 370/253 |

OTHER PUBLICATIONS

Amitava Dutta–Roy, *The cost of Quality in Internet–style Networks,* IEEE Spectrum, Sep. 2000 at 57–62.

* cited by examiner

*Primary Examiner*—Hassan Kizou
*Assistant Examiner*—Gregory B Sefcheck
(74) *Attorney, Agent, or Firm*—Marger Johnson & McCollom, P.C.

(57) ABSTRACT

Devices, software, and methods measure a burstiness of packet loss episodes in transmissions of voice data through networks. At least one burstiness statistic is determined to quantify how the lost packets are distributed with respect to the received packets within the sequence. The burstiness statistic is optionally used to determine a figure of merit, which in turn can be used to give a grade for predicting how well a packet loss concealment scheme will work.

68 Claims, 7 Drawing Sheets

DEVICES, SOFTWARE AND METHODS FOR MEASURING PACKET LOSS BURSTINESS TO DETERMINE QUALITY OF VOICE DATA TRANSMISSION THROUGH A NETWORK

BACKGROUND OF THE INVENTION

1. Field of the Invention

The present invention is related to the field of voice data transmission through a network, and more specifically to devices, software, and methods for measuring a burstiness of packet loss in determining a quality of voice for network telephony.

2. Description of the Related Art

Voice transmissions, such as telephone calls, are increasingly made over packet switched networks. Unlike traditional telephone lines, networks break down the voice into data, arrange the data in distinct packets, and send the packets across the network. The voice is reconstructed at the other end of the voice call for the listener.

Sometimes packets can be lost. This can happen when packets are dropped from the network, or are delivered too late to be incorporated in the reconstructed voice sequence. In that case, the packets are absent, but are generally called lost packets in the art.

When a packet is lost, that means that a portion of the voice message does not reach the listener. In its place, the listener hears a small interruption, or the voice is syncopated. Thus, losing packets degrades the quality of the voice call, and thus of the telephone service.

There have been efforts to rectify at least the problem of low call quality. For example, when a single packet is lost, its data can be reconstructed from its immediately previous data. So, even though its information may be actually lost, the user will not hear an interruption. This is called packet loss concealment.

Packet loss concealment is harder to perform, however, when many packets are lost in a large group. They are harder to reconstruct, because for many the immediately previous data is not available.

In addition, there have been efforts to monitor the quality of service, so that other corrective measures can be taken. These efforts include quantifying the quality of service, in other words, determining how poor the service is at any given time. Once service is determined to be poor, other corrective measures can be taken.

Quality of service is quantified by measuring other parameters in addition to packet loss. These other parameters are delay, echo, codec degradation, etc. All the parameters are taken together to determine a total voice quality statistic, or figure of merit.

Packet loss is traditionally measured in the prior art as a rate R according to Equation (1):

$$R = (\text{number of lost packets})/(\text{total number of packets}) \quad \text{Equation (1)}$$

Equation (1) is used to determine voice quality. By using Equation (1), however, the prior art makes a fundamental assumption about the nature of packet loss. The assumption is that packet loss is distributed uniformly over the duration telephone call.

The assumption of the prior art does not take into account the true nature of packet loss. Packet loss is not distributed uniformly over the duration telephone call. Instead, it tends to come in bursts, or groups. Worse, some bursts last longer than others. Yet the present systems do not detect that, which is a deficiency.

The deficiency of the prior art is illustrated with reference to FIG. 1. Three waveforms A, B, C, are given for three sample voice data transmissions, all of the same time duration. The waveforms A, B, C illustrate packets PR as they are received, prior to any data reconstruction for packet loss concealment.

Each of the three waveforms A, B, C, reflects a sequence as reconstructed. Each sequence leaves blanks PL for absent packets PL. Packets are absent either because they are lost, or simply arrive too late to be incorporated in the play out.

In all three waveforms A, B, C, one fifth, or 20% of the packets are not received. These are indicated as lost packets PL. So, for all three waveforms A, B, C, Equation (1) returns R=20%. This yields the same voice call quality grade for all three. In the example of FIG. 1, that grade is "FAIR".

It will be appreciated that the lost packets PL are grouped differently in each of waveforms A, B, C. In waveform A, the lost packets PL are distributed uniformly over the examined duration of the voice call. More particularly, every fifth packet PL is missing. In waveform B, the lost packets PL occur in somewhat bigger bursts. As drawn, every ninth and tenth packet PL are missing. In waveform C, all 10 packets are lost in one big burst.

In reality, for waveform B, the perception of the voice call quality will be somewhat worse than in waveform A, while the perception for waveform C will be by far the worst. That is because it will be harder to reconstruct the missing packets, since they occur in bursts. As such, waveform B deserves a worse grade than waveform A. For the same reason, waveform C deserves an even worse grade. That is because packet loss concealment is the hardest to perform for waveform C. Many of the immediately previous data is not available, and the voice will be perceived as lost.

The problem, however, is that the differentiation in eventual quality of the reconstruction is not predicted by the grading system.

BRIEF SUMMARY OF THE INVENTION

The present invention overcomes these problems and limitations of the prior art.

Generally, the present invention provides devices, software, and methods for measuring a burstiness of packet loss episodes, in determining a quality of a voice transmission through a network. More specifically, the invention teaches to determine a burstiness statistic, for quantifying how the lost packets are distributed with respect to the received packets within the sequence. The burstiness statistic is optionally used to determine a figure of merit, which in turn can be used to give a grade for predicting how well a packet loss concealment scheme will work.

The invention finds applications in broadcasting through a network (such as internet radio) and network telephony.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, software, and methods for measuring an additional statistic for quality of voice in Voice over Internet Protocol (VoIP) transmissions. The additional statistic measures a burstiness, grouping, or clustering in the pattern of lost packets. The invention is now described in more detail.

Figure 2:
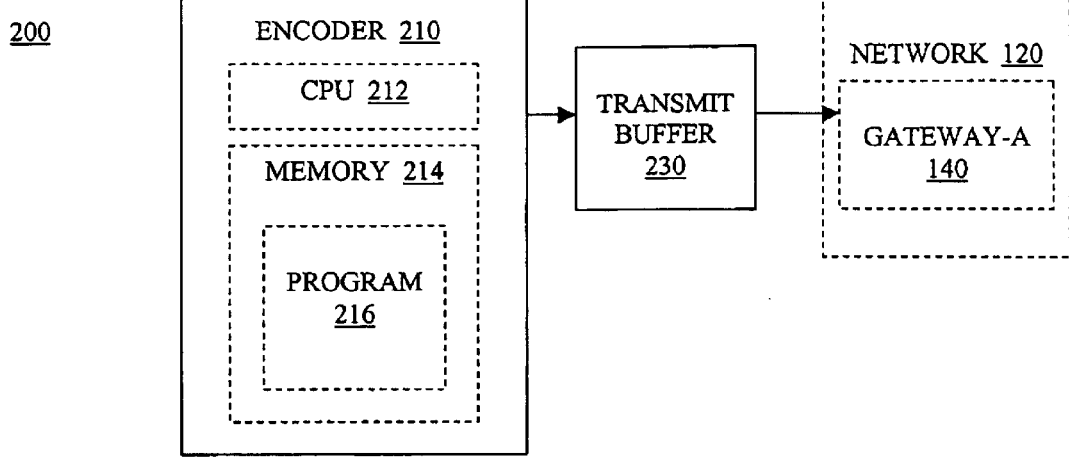
FIG. 2 is a block diagram of a transmitting device made according to an embodiment of the present invention.

Referring to FIG. 2, a transmitting device 200 made according to an embodiment of the invention is described. Device 200 is for transmitting voice packets through a network 120. Device 200 preferably transmits the voice packets to a network switch 140, such as Gateway-A 140, of the network 120.

One or more of the components of device 200 can be implemented in combination with each other, consistently with components of this description. For example, device 200 can be implemented as part of a larger Digital Signal Processing (DSP) architecture.

In the embodiment of FIG. 2, device 200 includes an encoder 210 for encoding a frame of voice data into a voice packet. Encoder 210 includes a processor 212, which is also referred to as Central Processing Unit (CPU) 212, and a memory 214. The processor 212 is adapted to perform the method of the invention. Preferably it is so adapted by running a program 216 made according to the invention, which resides on memory 214.

In addition, device 200 optionally includes a transmit buffer 230 adapted to receive inputs from the encoder 210, for storing the encoded frames prior to transmitting.

Device 200 includes a network interface (not shown separately) for interfacing with network 120. The network interface can be implemented as a stand-alone feature, or in conjunction with another component, such as transmit buffer 230.

Figure 3:
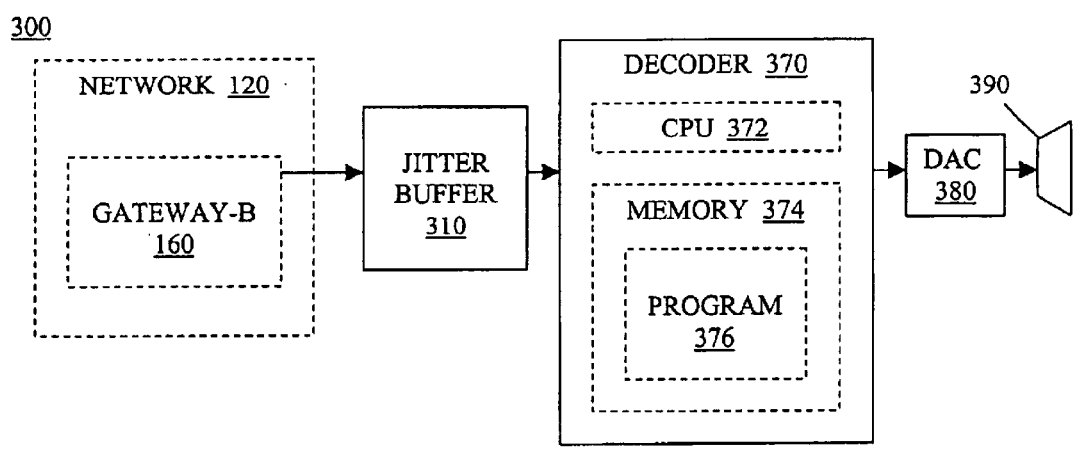
FIG. 3 is a block diagram of a receiving device made according to an embodiment of the present invention.

Referring to FIG. 3, a receiving device 300 according to the invention is described. One or more of the components of device 300 can be implemented in combination with each other, consistently with components of this description. For example, device 300 can be implemented as part of a larger Digital Signal Processing (DSP) architecture.

In the embodiment of FIG. 3, device 300 includes a jitter buffer 310. This stores a number of frames as they are received from the network 120. The jitter buffer thus prevents an anomaly that could be experienced, if frames were played out exactly when they are received. Due to the nature of transmission through the network 120, they can be received in bunches, with gaps between the bunches. Jitter buffer 310 permits playing them out at a regular pace, notwithstanding when exactly they are received.

Device 300 also includes a decoder 370. Decoder 370 includes a processor 372, which is also referred to as Central Processing Unit (CPU) 372, and a memory 374. The processor 372 is adapted to perform the method of the invention. Preferably it is so adapted by running a program 376 made according to the invention, which resides on memory 374.

Device 300 can also include other components, such as a Digital to Analog Converter (DAC) 380. This converts the decoded voice data into an analog signal, which can be input in a speaker 390.

Device 300 includes a network interface (not shown separately) for interfacing with network 120. The network interface can be implemented as a stand-alone feature, or in conjunction with another component, such as jitter buffer 310. Device 300 is deemed to interface with a network switch 160, such as Gateway-B 160, of network 120.

As an example, a device that may incorporate aspects of the present invention would be an Internet Protocol (IP) telephone. Its transmitting side could include device 200 of FIG. 2, while its receiving side could include device 300 of FIG. 3.

A device of the invention need not be limited to two-way voice communication. Devices, software and methods for one way transmitting, such as broadcasting, are also included.

The invention can be performed at the conclusion of a transmission, for example to calibrate a system. That would be using all the packets of the voice transmission, which can be 10,000 for a telephone call. Alternately the invention can be performed dynamically during the voice transmission by either participant. In that case, it can look at a segment of a waveform or sequence.

It is readily apparent that the present invention can be implemented by one or more devices that include logic circuitry. It can also be implemented by a device that includes a dedicated processor system, that can include a microcontroller or a microprocessor.

The invention additionally provides methods, which are described below. Moreover, the invention provides apparatus that performs, or assists in performing the methods of the invention. This apparatus may be specially constructed for the required purposes, or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein, or it may prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program, and a method of operation of the program. The program is most advantageously implemented as a program for a computing machine, such as a general purpose computer, a special purpose computer, a microprocessor, etc.

The invention also provides a storage medium that has the program of the invention stored thereon. The storage medium is a computer-readable medium, such as a memory, and is read by the computing machine mentioned above.

A program is generally defined as a sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they can be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming can use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention can be implemented by themselves, or in combination with others. Even though it is said that the program can be stored in a computer-readable medium, it should be clear to a person skilled in the art that it need not be a single memory, or even a single machine. Various portions, modules or features of it can reside in separate memories, or even separate machines. The separate machines may be connected directly, or through a network, such as a local access network (LAN), or a global network, such as the Internet.

In the present case, methods of the invention are implemented by machine operations. In other words, embodiments of the program of the invention are made such that they perform methods of the invention that are described in this document. These can be optionally performed in conjunction with one or more human operators performing some, but not all of them. As per the above, the users need not be collocated with each other, but each only with a machine that houses a portion of the program. Alternately, some of these machines can operate automatically, without users and/or independently from each other.

Methods of the invention are now described.

Figure 4:
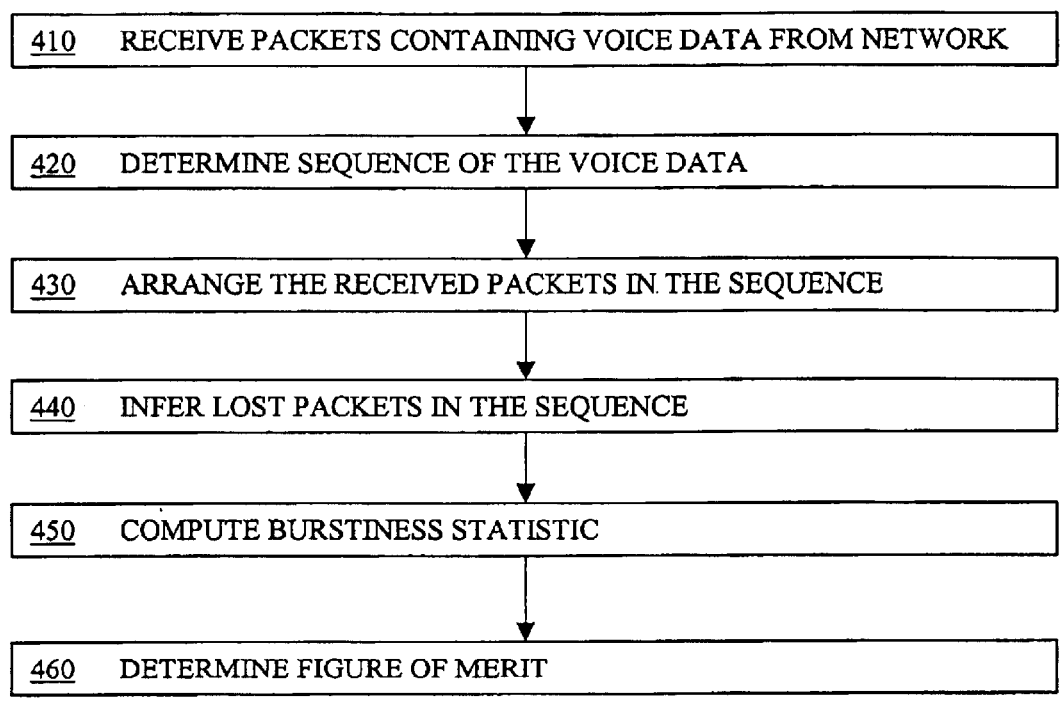
FIG. 4 is a flowchart illustrating methods according to embodiments of the present invention.

Referring now to FIG. 4, a flowchart 400 is used to illustrate methods according to embodiments of the invention.

According to a box 410, packets are received that contain voice data. Voice data are those data that represent sound, such as voice. The packets are received from a network, such as network 120 of FIG. 3.

According to a next box 420, an intended sequence of the voice data is determined. This is preferably performed by examining sequence data in the received packets.

According to a next box 430, the received packets are arranged in the sequence. This may leave blanks in the sequence.

According to a next box 440, lost packets PL are inferred to be in the blanks of the sequence.

According to a next box 450, a burstiness statistic is computed, for quantifying how the lost packets are distributed with respect to the received packets within the sequence. It will be perfectly apparent to a person skilled in the art that a burstiness statistic according to the invention is equivalently defined if it quantifies how the received packets are distributed with respect to the lost packets within the sequence.

A person skilled in the art will be able to determine a large number of burstiness statistics that can be computed according to the invention. By way of example, and not of limitation, two methods according to the invention are described later in this document, each of which yields at least two possible burstiness statistics.

According to an optional next box 460, a figure of merit is determined for the sequence from any one or more of the burstiness statistics computed according to the invention. The figure of merit can be an equipment impairment factor IE, which in turn can use other parameters.

The figure of merit is used to determine the overall grade given to the sequence. Optionally and preferably, it is also computed from the average packet loss rate R. This can be performed either by a table lookup, or using a polynomial function. The table or the coefficients of the polynomial can be determined using subjective or objective speech quality test results.

Figure 5:
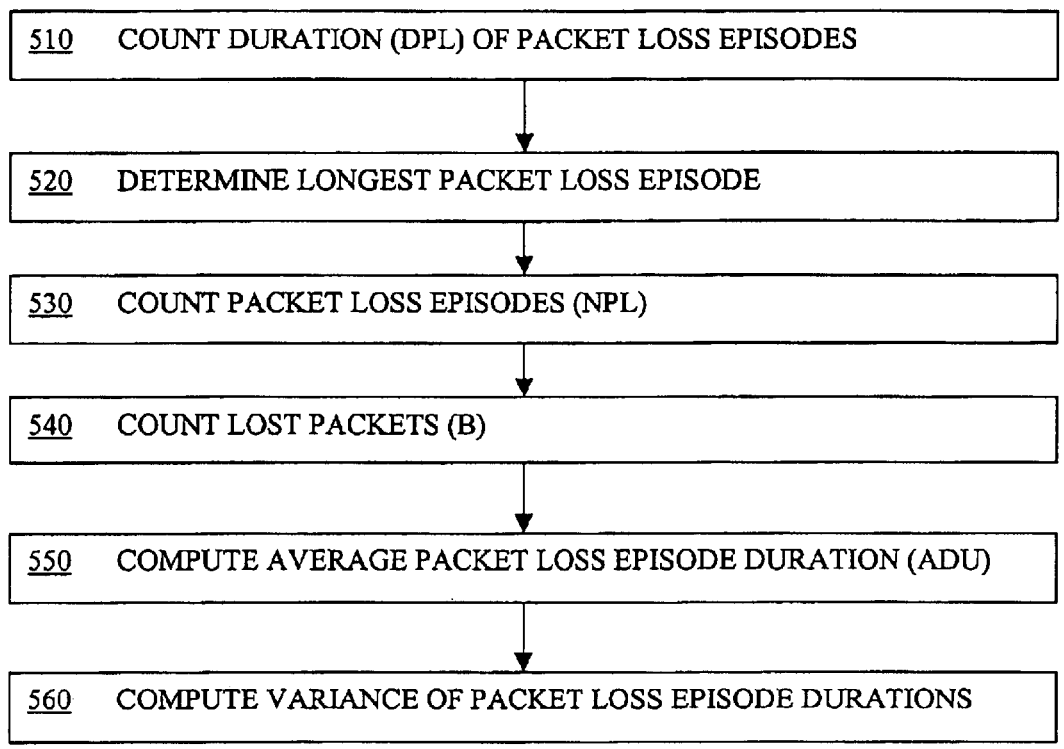
FIG. 5 is a flowchart illustrating methods for performing a box of the flowchart of FIG. 4.

Referring now to FIG. 5, a flowchart 500 is used for illustrating performing box 450 of FIG. 4 according to an embodiment of the invention.

According to a box 510, a duration is counted in the sequence of a packet loss episode. This is in the form of a number of lost packets PL, which is also known as duration number DPL. A packet loss episode is an episode of contiguously occurring lost packets PL. Equivalently, a duration number can be a number of contiguously occurring received packets PR. It is preferred that more than one duration numbers of the same type are counted.

According to an optional next box 520, the longest packet loss episode is determined. This is preferably performed by determining a maximum, or largest one, of the duration numbers DPL.

According to an optional next box 530, the packet loss episodes (NPL) are counted. Equivalently, the complementary packet received instances can be counted. While the complementary number may differ by one from NPL, the large numbers involved will make the difference insubstantial.

According to an optional next box 540, a number of packets is counted. In the preferred embodiment, the packets that are counted are the lost packets PL, yielding a variable that is denoted by B.

According to an optional next box 550, the average packet loss duration (ADU) is computed. Computation is performed preferably according to Equation (2):

$$ADU = B/NPL \qquad \text{Equation (2)}$$

According to an optional next box 560, a variance of ADU is computed.

Figure 6:
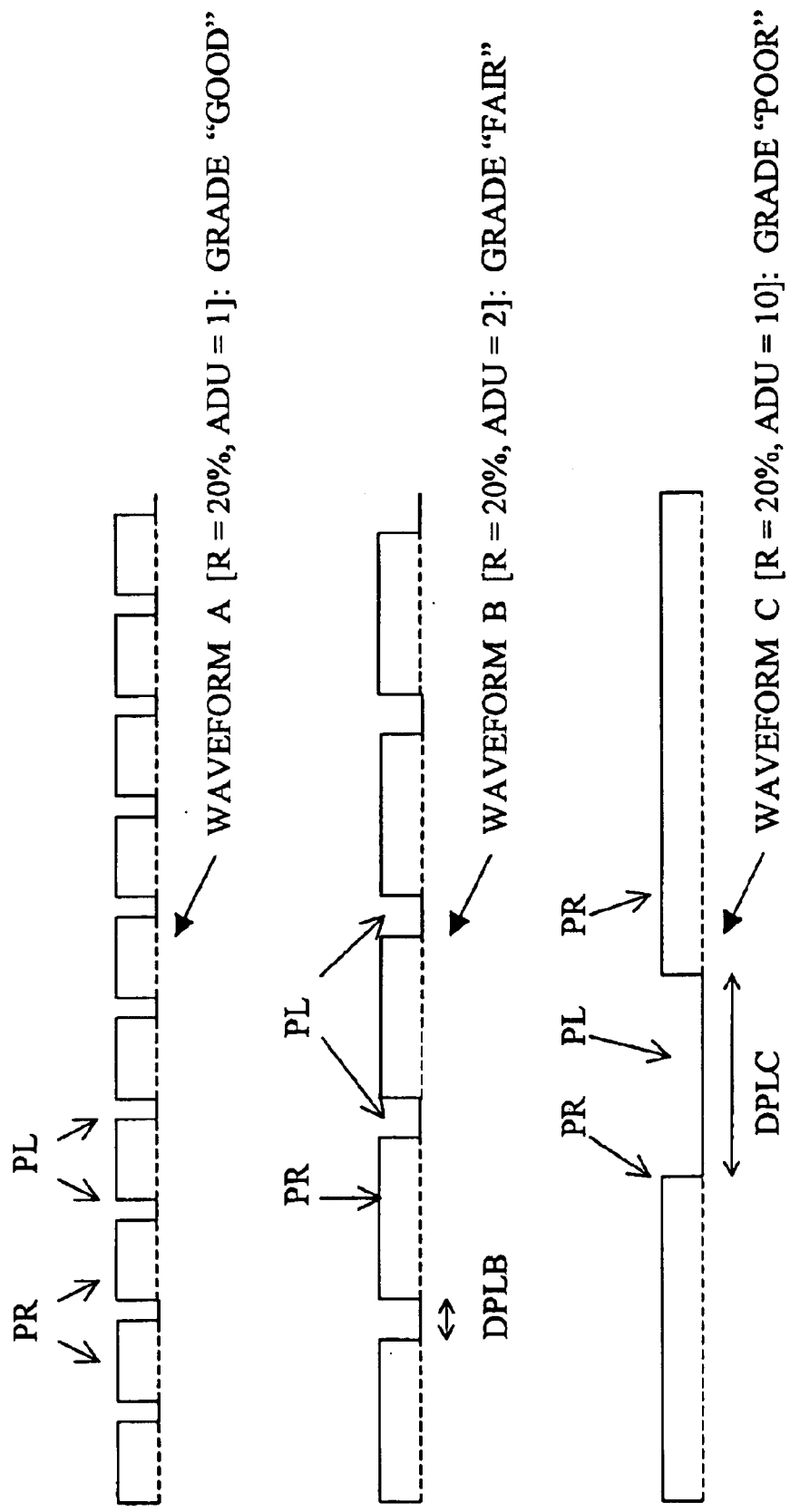
FIG. 6 illustrates the three possible waveforms of FIG. 1, and voice transmission quality grades assigned to these waveforms by embodiments of FIG. 5.

Referring to FIG. 6, the result of the embodiments of the invention can be appreciated in full. FIG. 6 shows the three waveforms of FIG. 1, except grading takes place according to the methods of FIG. 4 and FIG. 5, not the prior art.

In waveform A, the lost packets PL are the least grouped, and thus the burstiness is the least. Each gap is a packet loss episode PL. Equation (2) yields ADU=1 as a measure of the amount of burstiness. The grade "GOOD" can thus be assigned, since it can be anticipated that packet loss concealment can accommodate completely the little burstiness. This is even though the average packet loss rate P is 20%.

In waveform B, the lost packets PL are grouped or clustered a little more, and thus there is somewhat higher burstiness. Equation (2) yields ADU=2 as a measure of the amount of burstiness. Indeed, duration number DP would be DPLB=2 for all gaps of lost packets PL. The grade "FAIR" can thus be assigned, since it can be anticipated that packet loss concealment can accommodate mostly, but not completely, this amount of burstiness.

In waveform C, the lost packets PL are the most grouped, and thus the burstiness is the highest. Equation (2) yields ADU=10 as a measure of the amount of burstiness. Indeed, duration number DP would be DPLC=10 for the single gap. The grade "POOR" can thus be assigned, since these numbers, combined with an average packet loss rate of R=20%, can be used to anticipate that the known packet loss concealment techniques will not succeed in the face of such large gaps.

Figure 1:
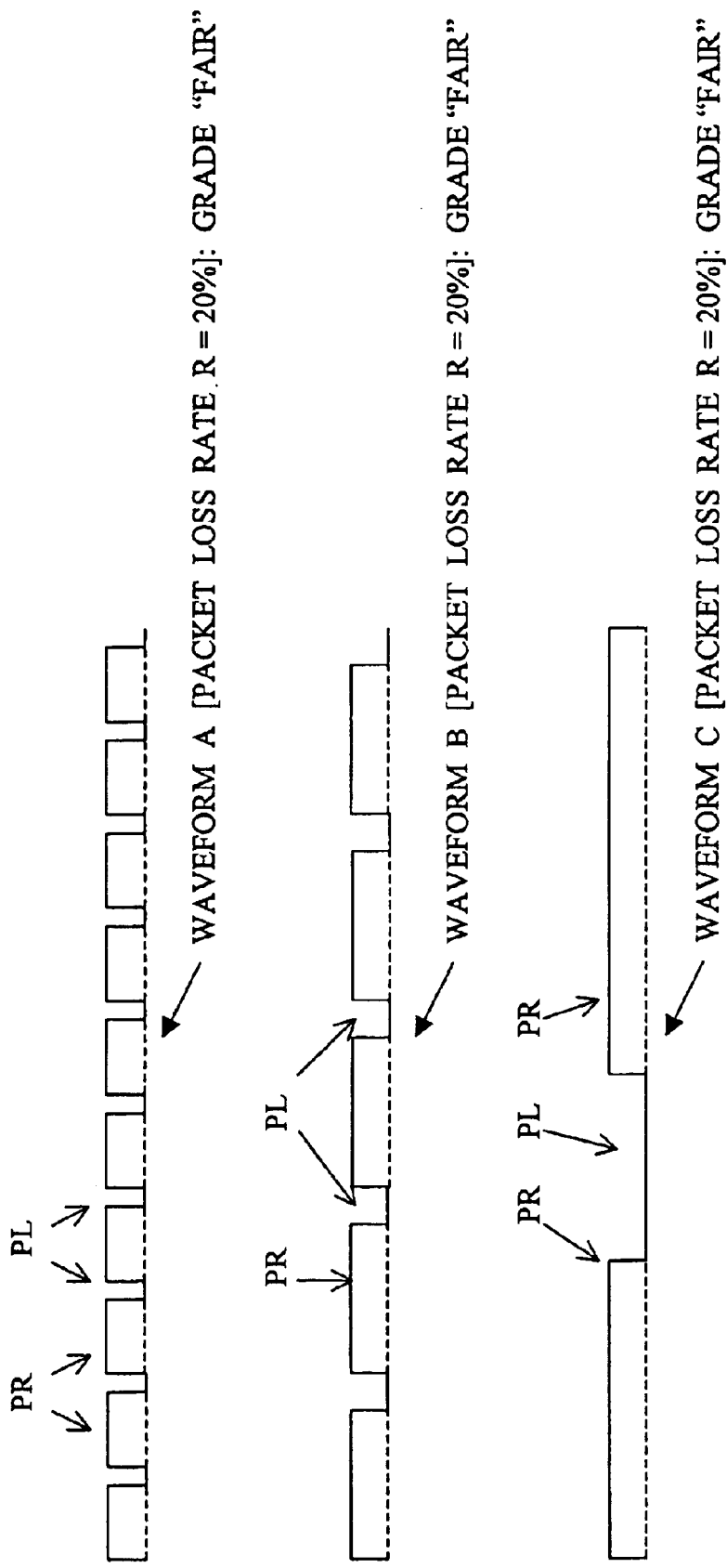
FIG. 1 illustrates three possible waveforms of received packets for a voice data transmission, and quality grades assigned to these waveforms by systems of the prior art.

It will be appreciated that the grades of FIG. 6 are more discerning than those of FIG. 1, and work better to predict the success of a packet loss concealment scheme.

Figure 7:
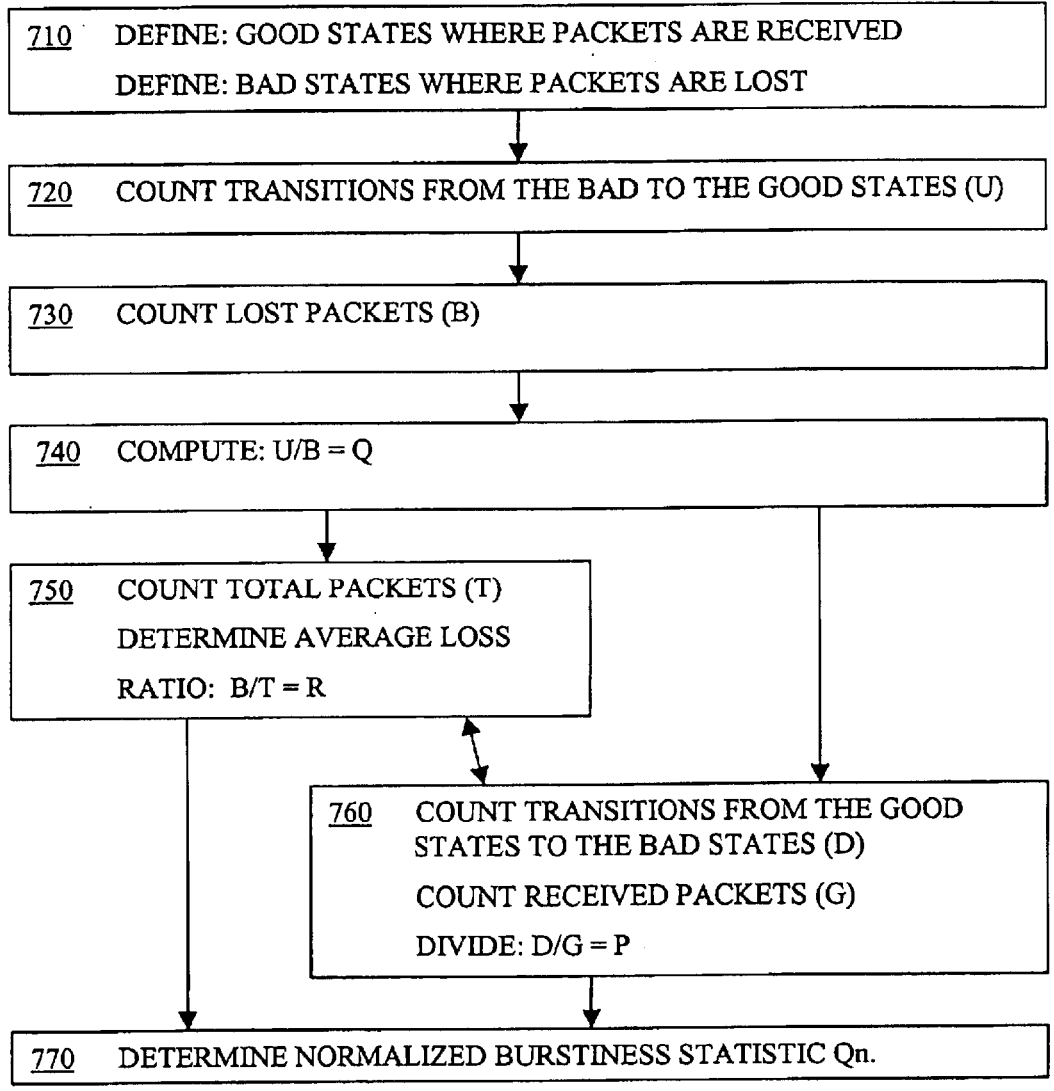
FIG. 7 is a flowchart illustrating methods for performing a box of the flowchart of FIG. 4.

Referring now to FIG. 7, a flowchart 700 is used for illustrating performing box 450 of FIG. 4 according to another embodiment of the invention. In the embodiment of FIG. 7, the burstiness statistic is computed by counting transitions between received packets PR and lost packets PL, using a Markov chain type model for the sequence. For a given average loss rate R, the more the transitions, the smaller the duration of each packet loss episode is inferred to be. The less each packet loss episode lasts, the less the burstiness, and a higher grade can be assigned.

More specifically, according to a box 710, good states are defined in the sequence where there are at least some received packets PR. In addition, bad states are defined in the sequence where there are lost packets PL.

According to a next box 720, the transitions are counted between the good states in the bad states. In the preferred embodiment, the transitions that are counted are from the bad states to the good states. That variable is denoted by U.

According to a next box 730, a number of packets is counted. In the preferred embodiment, the packets that are counted are the lost packets, yielding a variable that is denoted by B.

According to next box 740, the counted number of transitions is divided by the counted number of packets. This yields a variable that is denoted by Q, according to Equation (3):

$$Q = U/B \qquad \text{Equation (3)}$$

A number of different embodiments are now described with reference to boxes 750 and 760. As will be appreciated, execution can proceed from box 740, to box 750, to box 760, to box 770. Alternately, the order of box 750 and box 760 could be reversed. 30 In addition, one of box 750 and box 760 can be omitted.

Referring now to box 750, the total packets T are counted. In addition, the average loss ratio R is computed according to equation (1), which is repeated below:

$$R = \frac{\text{(number of lost packets)}}{\text{(total number of packets)}} = B/T \qquad \text{Equation (1)}$$

Referring now to box 760, the complementary transitions are counted, i.e. those from the good states to the bad states. This yields a variable D. In addition, the received packets PR are counted, which yields a variable G. Moreover, a variable P is computed from Equation (4) below. It will be appreciated that variable P is complementary to variable Q.

$$P = D/G \qquad \text{Equation (4)}$$

According to an optional next box 770, a normalized burstiness statistic Qn is computed according to Equation (5) below:

$$Qn = Q/(1-P) \qquad \text{Equation (5)}$$

It should also be appreciated that the normalized burstiness statistic of the equation (5) is chosen so as to amplify the computation of variable Q.

Now it will be appreciated why one of box 750, and 760 can be omitted. The above equations can be solved in the way as to avoid at least one of these boxes. For example, a corollary of these equations is equation (6) below:

$$R = P/(P+Q) \qquad \text{Equation (6)}$$

Figure 8:
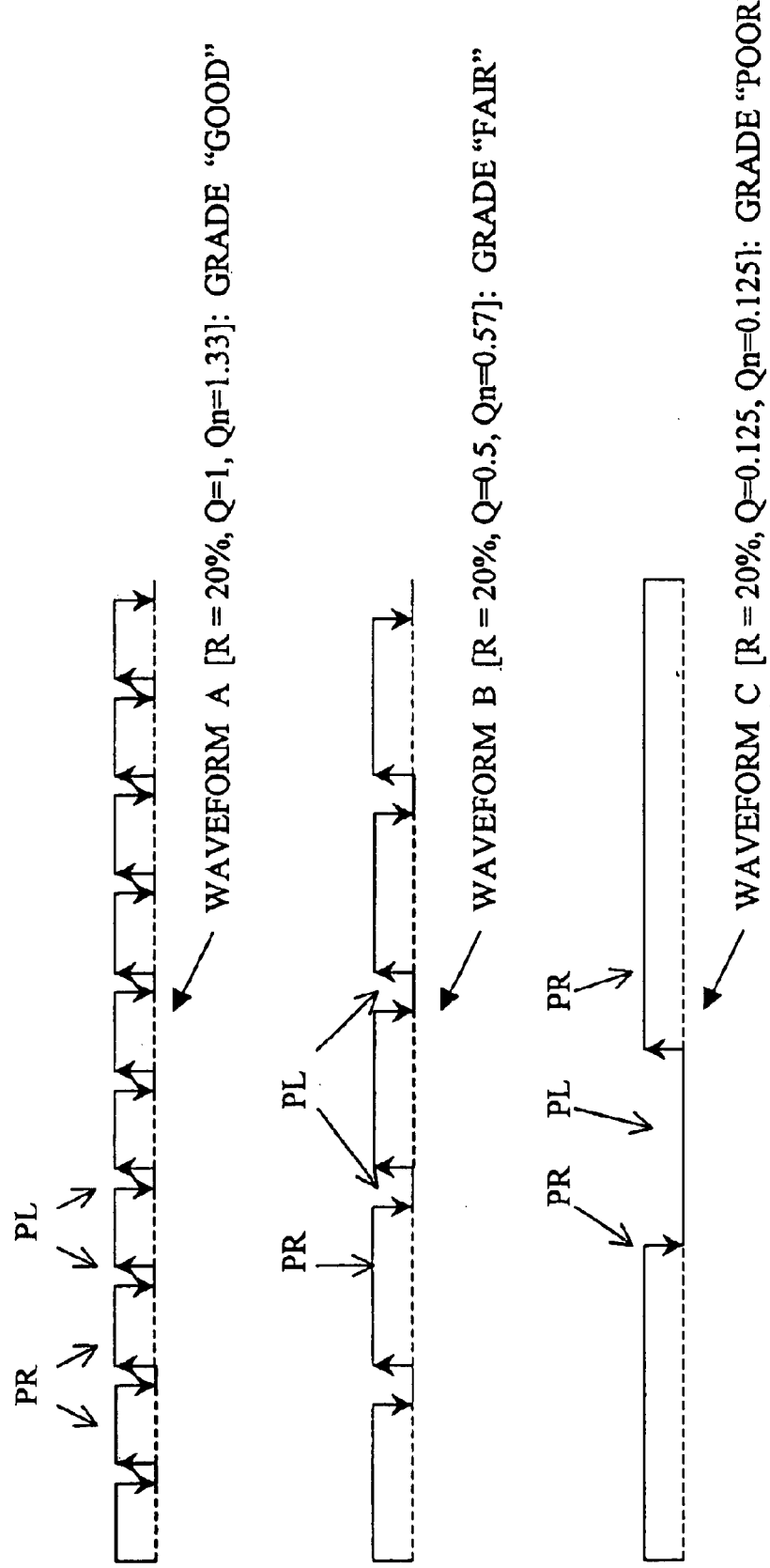
FIG. 8 illustrates the three possible waveforms of FIG. 1, and voice transmission quality grades assigned to these waveforms by embodiments of FIG. 7.

Referring to FIG. 8, the result of the embodiments of the invention can be appreciated in full. FIG. 8 shows the three waveforms of FIG. 1, except grading takes place according to the methods of FIG. 4 and FIG. 7, not the prior art. The waveforms show the transitions between the good and the bad states (i.e. from PL to PR, and vice versa) as arrows. Transitions at the beginning and the end of the waveform are not included, as they can be arbitrary.

In waveform A, the lost packets PL are the least grouped. Equations (3) and (5) yield Q=1, and Qn=1.33. The grade "GOOD" can thus be assigned, for the same rationale as in FIG. 6.

In waveform B, the lost packets PL are clustered a little more. Equations (3) and (5) yield Q=0.5, and Qn=0.57. The grade "FAIR" can thus be assigned, for the same rationale as in FIG. 6.

In waveform C, the lost packets PL are the most grouped. Equations (3) and (5) yield Q=0.125, and Qn=0.125. The grade "POOR" can thus be assigned, for the same rationale as in FIG. 6.

Again, it will be appreciated that the grades of FIG. 8 are more discerning than those of FIG. 1, and work better to predict the success of a packet loss concealment scheme.

The above description for a Markov chain type model can be extended for the implementations of FIG. 6. In addition, more burstiness parameters can be computed with a more general Markov chain type model. For example, one may use an M-state Markov chain model, having two states. The first state—1 is "good", state m corresponds a packet loss episode of length M-1, and so on. One will recognize that the examples worked above where for M=2, but that is not limiting. In fact, extending to a higher M yields another M-1 burstiness statistics that may be used as per the above.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

What is claimed is:

1. A device comprising:
    jitter buffer means for receiving from a network packets that encode data which represent sound; and
    decoding means for decoding the packets, the decoding means including a processor adapted to:
    determine an intended sequence of the sound data from the received packets;
    arrange the received packets in the sequence;
    infer lost packets in places of the sequence not having a corresponding received packet;
    measure durations for multiple different variable duration packet loss episodes; and
    determine a burstiness statistic for quantifying non-uniform lost packet distribution with respect to the received packets within the sequence according to the measured durations for the multiple different variable duration packet loss episodes wherein the burstiness statistic is derived independently of a packet loss rate.

2. The device of claim 1, wherein the processor is further adapted to-determine the burstiness statistic according to an identified longest one of the measured variable duration packet loss episodes.

3. The device of claim 2, wherein the processor is further adapted to-determine the burstiness statistic according to an average duration for the measured variable duration packet loss episodes.

4. The device of claim 1, wherein the processor is further adapted to determine the burstiness statistic by determining a duration number that identifies a non-uniform number of contiguously occurring lost packets or contiguously occurring received packets in the sequence of packets.

5. The device of claim 4, wherein the processor is further adapted to:
    determine a figure of merit for the sequence from the burstiness statistic.

6. The device of claim 5, wherein the processor is further adapted to:
    determine an average packet loss rate,
    wherein the figure of merit is determined also from the average packet loss rate.

7. The device of claim 4, wherein the processor generates multiple duration numbers identifying multiple different non-uniform durations of contiguously non-received packets in the sequence of packets and determines the burstiness statistic according to the multiple duration numbers.

8. The device of claim 5, wherein the processor generates the burstiness statistic according to a variance in the plurality of duration numbers.

9. The device of claim 1, wherein the processor is further adapted to determine the burstiness statistic by:
    defining good states in the sequence that correspond to at least some of the received packets;
    defining bad states in the sequence that correspond to at least some of the lost packets; and
    counting a number of transitions in the sequence between the good stales and the bad states.

10. The device of claim 9, wherein the processor is further adapted to:
    determine a figure of merit for the sequence from the burstiness statistic.

11. The device of claim 10, wherein the processor is further adapted to:
    determine an average packet loss rate,
    wherein the figure of merit is determined also from the average packet loss rate.

12. The device of claim 9, wherein the processor is further adapted to:
    compute a normalized burstiness statistic from the burstiness statistic.

13. The device of claim 12, wherein the processor is further adapted to:
    determine a figure of merit for the sequence from the normalized burstiness statistic.

14. The device of claim 13, wherein the processor is further adapted to:
    determine an average packet loss rate,
    wherein the figure of merit is determined also from the average packet loss rate.

15. The device of claim 9, wherein the processor is further adapted to determine the burstiness statistic by:
    count a number of packets; and
    divide the counted number of transitions by the counted number of packets.

16. The device of claim 15, wherein
    the counted transitions are from the bad states to the good states, and
    the counted packets are the lost packets.

17. A device comprising:
    a network interface for coupling to a network; and
    a processor coupled with the network interface, wherein the processor is adapted to receive packets containing sound data from a network;

determine an intended sequence of the sound data from the received packets;

arrange the received packets in the sequence;

infer lost packets in places of the sequence not having a corresponding received packet;

identifying durations for multiple different contiguous variable duration packet loss episodes;

calculating an average duration for the identified durations of the different contiguous variable duration packet loss episodes; and determine a burstiness statistic independently of a packet loss rate for quantifying non-uniform lost packet distribution with respect to the received packets within the sequence according to the calculated average duration for the different contiguous variable duration packet loss episodes.

18. The device of claim 17, wherein the processor is further adapted to compute the average duration by taking a ratio between a number of the variable duration packet loss episodes and a number of lost packets.

19. The device of claim 17, wherein the processor is further adapted to determine the burstiness statistic according to a duration number that identifies a non-uniform number of contiguously occurring lost packets or contiguously occurring received packets in the sequence of packets.

20. The device of claim 19, wherein the processor is further adapted to:

determine a figure of merit for the sequence from the burstiness statistic.

21. The device of claim 20, wherein the processor is further adapted to:

determine an average packet loss rate, wherein the figure of merit is determined also from the average packet loss rate.

22. The device of claim 19, wherein the burstiness statistic is a maximum of a plurality of duration numbers.

23. The device of claim 19, wherein the burstiness statistic is an average of a plurality of duration numbers.

24. The device of wherein the burstiness statistic is a variance of a plurality of duration numbers.

25. The device of claim 17, wherein the processor is further adapted to determine the burstiness statistic by:

defining good states in the sequence that correspond to at least some of the received packets;

defining bad states in the sequence that correspond to at least some of the lost packets; and counting a number of transitions in the sequence between the good states and the bad states.

26. The device of claim 25, wherein the processor is further adapted to:

determine a figure of merit for the sequence from the burstiness statistic.

27. The device of claim 26, wherein the processor is further adapted to:

determine an average packet loss rate, wherein the figure of merit is determined also from the average packet loss rate.

28. The device of claim 25, wherein the processor is further adapted to:

compute a normalized burstiness statistic from the burstiness statistic.

29. The device of claim 28, wherein the processor is further adapted to:

determine a figure of merit for the sequence from the normalized burstiness statistic.

30. The device of claim 29, wherein the processor is further adapted to:

determine an average packet loss rate, wherein the figure of merit is determined also from the average packet loss rate.

31. The device of claim 25, wherein the processor is further adapted to determine the burstiness statistic by:

count a number of packets; and divide the counted number of transitions by the counted number of packets.

32. The device of claim 31, wherein the counted transitions are from the bad states to the good states, and the counted packets are the lost packets.

33. An article comprising: a storage medium, said storage medium having stored thereon instructions, that, when executed by at least one device, result in:

receiving packets containing sound data from a network;

determining an intended sequence of the sound data from the received packets;

arranging the received packets in the sequence;

inferring lost packets in locations of the sequence not having a corresponding received packet;

identifying durations for multiple different contiguous variable duration packet loss episodes;

calculating an average duration for the identified durations of the different contiguous variable duration packet loss episodes; and determining a burstiness statistic for quantifying how the lost packets are distributed with respect to the received packets within the sequence according to the calculated average duration for the different contiguous variable duration packet loss episodes and deriving the burstiness statistic independently of a packet loss rate.

34. The article of claim 33, wherein the instructions further result in computing the average duration by taking a ratio between a number of the variable duration packet loss episodes and a number of lost packets.

35. The article of claim 33, wherein the instructions result in determining the burstiness statistic by:

determining at least one duration number in the sequence, wherein the duration number is determined by counting either the number of contiguously occurring lost packets or contiguously occurring received packets.

36. The article of claim 35, wherein the instructions further result in:

determining a figure of merit for the sequence from the burstiness statistic.

37. The article of claim 36, wherein the instructions further result in:

determining an average packet loss rate, wherein the figure of merit is determined also from the average packet loss rate.

38. The article of claim 35, the burstiness statistic is a maximum of a plurality of duration numbers.

39. The article of claim 35, wherein the burstiness statistic is an average of a plurality of duration numbers.

40. The article of claim 35, wherein the burstiness statistic is a variance of a plurality of duration numbers.

41. The article of claim 33, wherein the instructions result in determining the burstiness statistic by:

defining good states in the sequence that correspond to at least some of the received packets;

defining bad states in the sequence that correspond to at least some of the lost packets; and counting a number of transitions in the sequence between the good states and the bad states.

42. The article of claim 41, wherein the instructions further result in:

determining a figure of merit for the sequence from the burstiness statistic.

43. The article of claim 42, wherein the instructions further result in:

determining an average packet loss rate, wherein the figure of merit is determined also from the average packet loss rate.

44. The article of claim 41, wherein the instructions further result in:

computing a normalized burstiness statistic from the burstiness statistic.

45. The article of claim 44, wherein the instructions further result in:

determining a figure of merit for the sequence from the normalized burstiness statistic.

46. The article of claim 45, wherein the instructions further result in:

determining an average packet loss rate, wherein the figure of merit is determined also from the average packet loss rate.

47. The article of claim 41, wherein the instructions further result in determining the burstiness statistic by:

counting a number of packets; and dividing the counted number of transitions by the counted number of packets.

48. The article of claim 47, wherein the counted transitions are from the bad states to the good states, and the counted packets are the lost packets.

49. A method comprising:

receiving packets containing sound data from a network;

determining an intended sequence of the sound data from the received packets;

arranging the received packets in the sequence;

inferring lost packets in places of the sequence not having a corresponding received packet;

measuring durations for multiple different contiguous variable duration packet loss episodes; and determining a burstiness statistic for quantifying how the lost packets are non-uniformly distributed with respect to the received packets within the sequence according to the measured durations for the multiple different variable duration packet loss episodes that is derived independently of a packet loss rate for the received packets.

50. The method of claim 49, further comprising:

determining a figure of merit for the sequence from the burstiness statistic.

51. The method according to claim 49 including:

calculating an average duration for the measured durations of the different contiguous variable duration packet loss episodes; and determining the burstiness statistic according to the calculated average duration for the different contiguous variable duration packet loss episodes.

52. The method of claim 49, wherein the burstiness statistic is determined by:

determining at least one duration number in the sequence, wherein the duration number is determined by counting either the number of contiguously occurring lost packets or contiguously occurring received packets.

53. The method of claim 52, further comprising:

determining a figure of merit for the sequence from the burstiness statistic.

54. The method of claim 53, further comprising:

determining an average packet loss rate, wherein the figure of merit is determined also from the average packet loss rate.

55. The method of claim 52, wherein the burstiness statistic is a maximum of a plurality of duration numbers.

56. The method of claim 52, wherein the burstiness statistic is an average of a plurality of duration numbers.

57. The method of claim 52, wherein the burstiness statistic is a variance of a plurality of duration numbers.

58. The method of claim 49, wherein the burstiness statistic is determined by:

defining good states in the sequence that correspond to at least some of the received packets;

defining bad states in the sequence that correspond to at least some of the lost packets; and counting a number of transitions in the sequence between the good states and the bad states.

59. The method of claim 58, further comprising:

determining a figure of merit for the sequence from the burstiness statistic.

60. The method of claim 59, further comprising:

determining an average packet loss rate, wherein the figure of merit is determined also from the average packet loss rate.

61. The method of claim 58, further comprising:

computing a normalized burstiness statistic from the burstiness statistic.

62. The method of claim 61, further comprising:

determining a figure of merit for the sequence from the normalized burstiness statistic.

63. The method of claim 62, further comprising:

determining an average packet loss rate, wherein the figure of merit is determined also from the average packet loss rate.

64. The method of claim 58, wherein the burstiness statistic is further determined by:

counting a number of packets; and dividing the counted number of transitions by the counted number of packets.

65. The method of claim 64, wherein the counted transitions are from the bad states to the good states, and the counted packets are the lost packets.

66. A method comprising:

receiving packets containing sound data from a network determining an intended sequence of the sound data from the received packets, where the sequence is comprised of a plurality of locations;

arranging each received packet into a corresponding location in the sequence;

inferring lost packets in locations of the sequence not having a corresponding received packet; and determining a burstiness statistic from the locations of the lost and received packets in the sequence, where the burstiness statistic is determined independently of a packet loss rate and quantifies non-uniform lost packet distribution with respect to the received packets within the sequence.

67. The method of claim 66, further comprising:

determining a figure of merit for the sequence from the burstiness statistic.

68. The method of claim 67, further comprising:

determining an average packet loss rate, wherein the figure of merit is determined also from the average packet loss rate.

* * * * *

UNITED STATES PATENT AND TRADEMARK OFFICE
CERTIFICATE OF CORRECTION

PATENT NO.        : 6,930,982 B2
APPLICATION NO. : 09/735429
DATED             : August 16, 2005
INVENTOR(S)       : Jagadeesan It is certified that error appears in the above-identified patent and that said Letters Patent is hereby corrected as shown below:

At column 8, line 13, please replace "could be reversed. 30 In" with --could be reversed. In--

At column 10, line 29, please replace "good stales" with --good states--

At column 11, line 40, please replace "the device of wherein" with --the device of claim 19, wherein--

At column 12, line 58, please replace "The article of claim 35, the" with --The article of claim 35, wherein the--

At column 14, line 57, please replace "from a network" with --from a network;--

Signed and Sealed this

Twenty-ninth Day of August, 2006

JON W. DUDAS
*Director of the United States Patent and Trademark Office*